United States Patent

Yoshikawa et al.

[15] 3,691,423

[45] Sept. 12, 1972

[54] METHOD OF IMPROVING THE RESOLUTION OF AN IMAGE CONVERTER SYSTEM

[72] Inventors: Mituhiro Yoshikawa; Hiroshi Nihei, both of Mobara; Hiroichi Shibasaki, Chiba-ken, all of Japan

[73] Assignee: Hitachi, Ltd., Tokyo, Japan

[22] Filed: Dec. 30, 1969

[21] Appl. No.: 889,354

Related U.S. Application Data

[62] Division of Ser. No. 627,076, March 30, 1967, abandoned.

[30] Foreign Application Priority Data

April 6, 1966 Japan ......................41/21197

[52] U.S. Cl. ..............................................315/31 TV

[51] Int. Cl. ..............................................H01j 29/70

[58] Field of Search.....315/31 TV, 31 R, 30; 313/78, 313/79

[56] References Cited

UNITED STATES PATENTS

| | | | |
|---|---|---|---|
| 2,901,661 | 8/1959 | Neuhauser | 315/31 TV |
| 3,023,336 | 2/1962 | Frenkel | 315/31 TV |

*Primary Examiner*—Carl D. Quarforth
*Assistant Examiner*—J. M. Potenza
*Attorney*—Craig, Antonelli and Hill

[57] ABSTRACT

A method of improving the resolution of an image converter system having a pickup tube is related to the selective adjustment of currents applied to an electromagnetic focusing means and an electrostatic focusing means so that the electromagnetic focusing means provides no more than 80 percent and not less than 20 percent of the total focusing field provided by the electromagnetic means and the electrostatic means in combination.

5 Claims, 3 Drawing Figures

INVENTORS
MITUHIRO YOSHIKAWA
HIROSHI NINEI
HIROICHI SHIBASAKI

BY Paul M. Craig, Jr.
ATTORNEY

INVENTORS
MITUHIRO YOSHIKAWA
HIROSHI NIHEI
HIROICHI SHIBASAKI

BY Paul M. Craig, Jr.
ATTORNEY

METHOD OF IMPROVING THE RESOLUTION OF AN IMAGE CONVERTER SYSTEM

CROSS REFERENCE TO THE RELATED APPLICATION

This application is a divisional application of U.S. Ser. No. 627,076 filed on Mar. 30, 1967, now abandoned.

BACKGROUND OF THE INVENTION

1. Field of the Invention

This invention relates to a novel method of improving the resolution of image converter system for use in TV cameras and the like.

2. Description of the Prior Art

Image converter systems for TV cameras and the like generally comprise the combination of a pickup tube and a deflecting and focusing unit. In the image converter system, the deflecting and focusing unit is associated with the pickup tube so that an electron beam obtained by the electron emission from the cathode of the pickup tube is deflected and focused to scan the photoconductor surface to thereby derive an electrical signal corresponding to an image formed on the photoconductor surface. The deflecting and focusing unit described above has been available in various types, including an electromagnetic deflection and electromagnetic focusing type, electromagnetic deflection and electrostatic focusing type, and electrostatic deflection and electrostatic focusing type. These deflecting and focusing units have found their individual applications depending on their various types. For example, an electromagnetic deflection and electromagnetic focusing type of pickup tube has been combined with an electromagnetic deflection and electromagnetic focusing unit to form an image converter system.

The image converter system of an electromagnetic deflection and electromagnetic focusing type has heretofore been most commonly employed for image conversion. While this type of image converter system is advantageous in that a picture of relatively high resolution can be easily obtained, it is defective in that the resolution at the corners of the photoconductor surface is poorer than the resolution at the central portion of the photoconductor surface, that is, the focusing voltage at the central portion of the photoconductor surface is different from that at the corners of the photoconductor surface. This difference in the focusing voltage leads to the defect that a shadow of the mesh of the pickup tube is liable to develop at the corners of the photoconductor surface when the electron beam is focused on the central portion of the photoconductor surface, the quality of the picture is thereby degraded, and a large degree of S-shaped distortion tends to occur. In an attempt to compensate for these defects, a method has been already commonly practised to increase the focusing magnetic field. This method, however, has unavoidably resulted in an uneconomical system, due to the fact that the deflecting power must be increased to give an increased strength to the focusing magnetic field. The image converter system of the type having an electromagnetic deflection and electrostatic focusing pickup tube combined with an electromagnetic deflection and electrostatic focusing unit is advantageous in its lower degree of S-shaped distortion than in the electromagnetic deflection and electromagnetic focusing type and also in its small power of deflection. However, this type of image converter system is defective in its poor resolution at the central portion of the photoconductor surface, which results in the inefficient and vital defect that the overall size of the electrostatic lens must be enlarged to compensate for the poor resolution at the central portion of the photoconductor surface. On the other hand, the image converter system of electrostatic deflection and electrostatic focusing type is advantageous in its small deflecting power, but is defective in that the resolution is very much poorer than in the above two types of image converter systems and the structure is very complex in view of the nature of the system.

SUMMARY OF THE INVENTION

It is the primary object of the invention to provide a novel method of improving the resolution of an image converter system.

According to this invention, there is provided a method of improving the image conversion in a pickup tube having an electrostatic focusing electrode assembly therein with an electromagnetic deflection yoke and an electromagnetic focusing means, which comprises applying suitable current to said electrode assembly, said deflection yoke and said electromagnetic focusing means for effecting electromagnetic and electrostatic focusing and electromagnetic deflection of an electron beam in said pickup tube, and adjusting the current of said electromagnetic focusing means so that it contributes not less than 20 percent and no more than 80 percent of the total focusing field provided by said electrostatic focusing electrode assembly and said electromagnetic focusing means in combination. In an image converter system, the use of the present method not only gives a picture of high resolution and high quality but also requires a smaller power for deflection, and is less liable to develop S-shaped distrotion.

DESCRIPTION OF THE PREFERRED EMBODIMENTS

Figure 1:
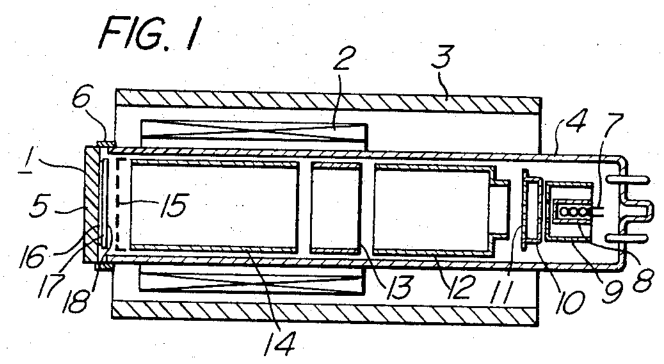
FIG. 1 is a schematic axial sectional view of an image converter system for illustrating the present invention.

Referring to FIG. 1 showing principal parts of the image converter system according to the invention, an electromagnetic deflection yoke 2 surrounds an electromagnetic deflection and electrostatic focusing type of a pickup tube 1 (hereinafter to be merely referred to as a pickup tube), and an electromagnetic focusing means 3, such as a focusing coil or permanent magnet for the electromagnetic focusing of an electron beam, is disposed about the deflection yoke 2 to form the so-called image converter system of the electromagnetic deflection and electrostatic-electromagnetic focusing type. The pickup tube 1 comprises a vacuum envelope formed by a bulb 4, a face plate 5 and a signal ring 6; an electron gun consisting of coaxially aligned elements including a heater 7, a cathode 8, a first grid 9, a second grid 10 and a beam disk 11; a focusing electrode assembly arranged on the central axis of this electron gun and consisting of a third grid 12, a fourth grid 13 and a fifth grid 14 all of cylindrical shape; and a mesh electrode 15 disposed in parallel with the face plate 5. A transparent conductive film 16 is vacuum evaporated onto that face of the face plate 5 which is on the interior side of the vacuum envelope and a photoconductive film 17 of antimony trisulfide is vacuum evaporated onto the transparent conductive film 16 to form a photoconductor surface 18.

A current is supplied to the electromagnetic focusing means 3 of the image converter system from an external power supply (not shown) to generate a focusing magnetic field for the focusing of an electron beam in the axial direction, and a d.c. voltage is applied to each of the signal ring 6, second grid 10, beam disk 11, third grid 12, fourth grid 13 and fifth grid 14 to generate an electrostatic field for the electrostatic focusing of the electron beam. In accordance with the invention, the current supplied to the electromagnetic focusing means 3 is set at a current value which will produce a magnetic flux density of about 20 to 80 percent of the magnetic flux density (of about 40 gauss) which may be required when the image converter system according to the invention is operated in such a manner that the electromagnetic focusing means 3 is solely used for the electromagnetic focusing of the electron beam. Further, the third grid 12, fifth grid 14 and mesh electrode 15 are kept at the same potential of, for example, about 300 volts, while at the same time a voltage is applied to the fourth grid 13 so that the overall focusing effect derivable from the combined focusing action on the electron beam in the pickup tube by the electromagnetic focusing magnetic field by the electromagnetic focusing means and the electrostatic focusing electrostatic fields by these grids may be substantially similar to the focusing effect derivable from the sole use of the electromagnetic focusing means. In the present embodiment, this voltage may, for example, be about 20 to 80 percent of the voltage applied to the third and fifth grids and the mesh electrode. Thus, the current supplied to the electromagnetic focusing means 3 and the voltage applied to at least one of the electrostatic focusing grids may each be adjusted so that the electromagnetic focusing means 3 contributes not less than 20 percent and no more than 80 percent of the total focusing field provided by the electrostatic focusing grid electrode assembly and the electromagnetic means in combination.

Deflecting pulses may be applied to the deflecting yoke 2 so as to focus and deflect the electron beam onto the face plate 5 in cooperation with the action of the electrostatic focusing fields and the electromagnetic focusing magnetic field.

The density of magnetic flux produced by the electromagnetic focusing means 3 should be limited to the above value because, with a flux density of less than 20 percent, the effect of electrostatic focusing is increased while the effect of electromagnetic focusing is reduced, and with a flux density of more than 80 percent, the effect of electromagnetic focusing is increased while the effect of electrostatic focusing is reduced.

Figure 2:
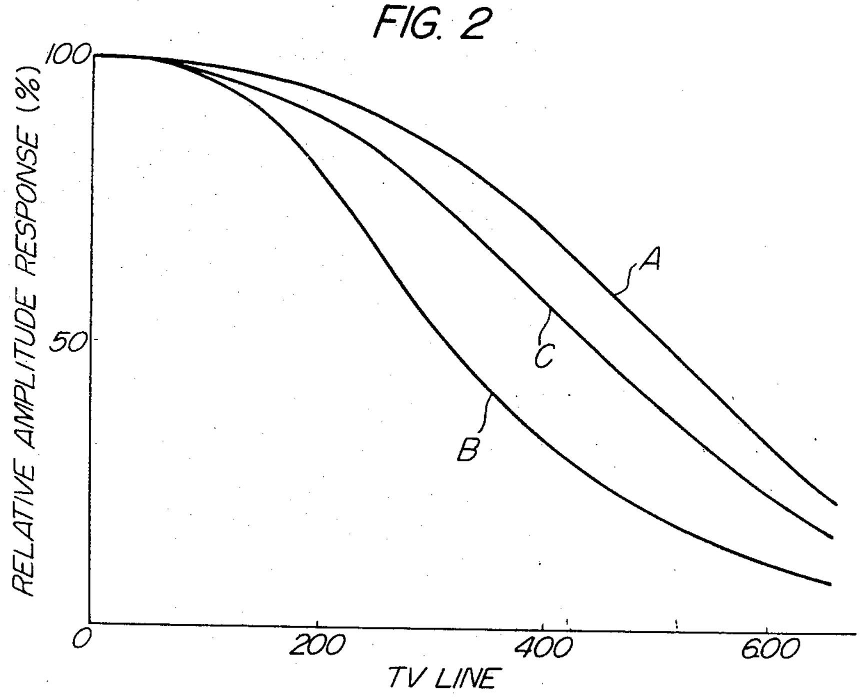
FIG. 2 is a graph showing a relative amplitude response at the central portion of the photoconductor surface in the image converter system employing the invention compared with those in prior art systems.
Figure 3:
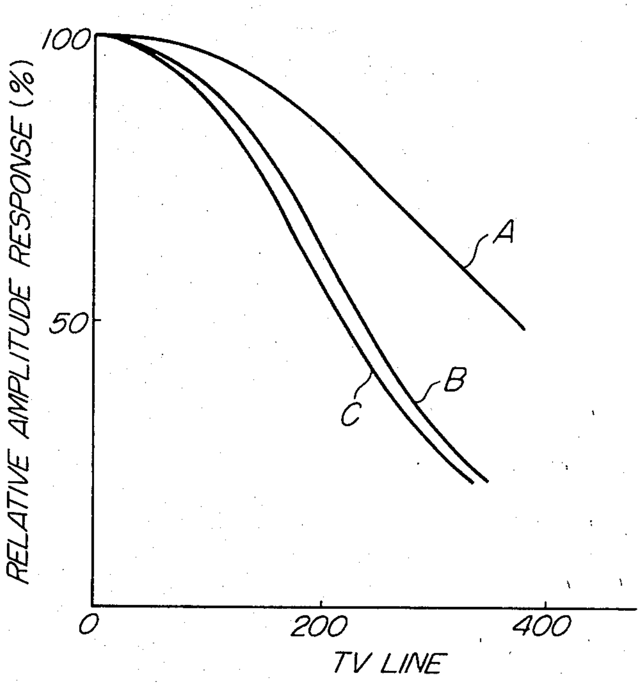
FIG. 3 is a graph showing a relative amplitude response at the corner of the photoconductor surface in the image converter system employing the invention compared with those in prior art systems.

One example of the prominent characteristic obtained from the image converter system according to the invention is graphically shown in FIGS. 2 and 3 in which a relative amplitude response is plotted against TV lines. FIG. 2 shows the relative amplitude response curves at the central portion of the photoconductor surface, in which the curve A represents a relative amplitude response with the system according to the invention, that is, with the operational image converter system of the electromagnetic deflection and electrostatic-electromagnetic focusing type, the curve B represents a relative amplitude response with a prior art operational image converter system of electromagnetic deflection and electrostatic focusing type, and the curve C represents a relative amplitude response with a prior art operational image converter system of electromagnetic deflection and electromagnetic focusing type. FIG. 3 shows relative amplitude response curves at the corner of the photoconductor surface, in which the curve A represents a relative amplitude response with the image converter system of electromagnetic deflection and electrostatic-electromagnetic focusing type employing this invention, the curve B represents a relative amplitude response with the prior art image converter system of electromagnetic deflection and electrostatic focusing type, and the curve C represents a relative amplitude response with AMPLITUDE with WITH the prior art image converter system of electromagnetic deflection and electromagnetic focusing type. From FIGS. 2 and 3 it can be seen that the characteristics represented by curves A are superior to those represented by curves B and C, that is, the relative amplitude response with the system employing the invention is superior to those with the prior art systems in both the central portion and the corner portion of the photoconductor surface, and the uniformity over the entire photoconductor surface is far more excellent than in the prior case.

The image converter system according to the invention is excellent in its substantial freedom from S-shaped distortion and in its capability of effecting about 50 percent reduction of deflecting power compared with the prior image converter system of electromagnetic deflection and electromagnetic focusing type. The excellent performance of the present invention is derivable from the fact that the density of magnetic flux produced by the electromagnetic focusing means in the image converter system according to the invention can be reduced to about 20 to 80 percent of the density of magnetic flux produced by the electromagnetic focusing means of the prior image converter system of electromagnetic deflection and electromagnetic focusing type and the fact that electrostatic focusing is additionally provided in the system according to the invention.

We claims:

1. A method of improving image conversion in a pickup tube having an electrostatic focusing electrode assembly therein with an electromagnetic deflection yoke and an electromagnetic focusing means, comprising applying suitable currents to said electrode assembly, said deflection yoke and said electromagnetic focusing means for effecting electromagnetic and electrostatic focusing and electromagnetic deflection of an electron beam in said pickup tube, and adjusting the current of said electromagnetic focusing means so that it contributes not less than 20 percent and not more than 80 percent of the total focusing field provided by said electrostatic focusing electrode assembly and said electromagnetic focusing means in combination.

2. A method of improving the resolution of an image converter system comprising a pickup tube having at least three electrodes coaxially disposed therein to provide a main electronic focusing lens, an electromagnetic deflection yoke provided outside of said pickup tube, and magnetic field generating means so arranged to substantially cover said electrodes to thereby focus an electron beam therein, the improvement comprising:

a. applying voltages to said electrodes to produce electrostatic fields; and
b. adjusting said magnetic field generating means and the applied voltages of said electrodes so that the magnetic field emanating from said magnetic field generating means provides between 20 and 80 percent of the focusing field generated by said three coaxially disposed electrodes and said magnetic field generating means with the electrostatic and magnetic fields having a superimposed relationship within said main lens.

3. A method of improving the resolution of an image converter system comprising a pickup tube having at least three electrodes coaxially disposed therein to provide a main electronic focusing lens, an electromagnetic deflection yoke provided outside of said pickup tube, and magnetic field generating means so arranged to substantially cover said electrodes to thereby focus an electron beam therein, the improvement comprising:

a. applying voltages to said electrodes to produce electric fields, thereby effecting electrostatic focusing of said electron beam;
b. superimposing said electric field with a magnetic field emanating from said magnetic field generating means; and
c. adjusting the applied voltage of at least one electrode among said three coaxially disposed electrodes which is in a focusing electric field region having the largest electron beam focusing effect within said main electronic focusing lens so that said superimposed magnetic field has a magnetic flux density of about 20 to 80 percent of that which may be required when said magnetic field generating means is solely used for the electromagnetic focusing of the electron beam in said electric field region.

4. A method of improving the resolution of an image converter system comprising a pickup tube having at least three electrodes coaxially disposed therein to provide a main electronic focusing lens, an electromagnetic deflection yoke provided outside of said pickup tube, and magnetic field generating means so arranged to substantially cover said electrodes to thereby focus an electron beam therein, the improvement comprising:

a. applying a voltage to said electrodes;
b. applying a magnetic field emanating from said magnetic generating means to said electrodes, thereby focusing said electron beam;
c. reducing the magnetic field to de-focus the beam; and
d. adjusting the applied voltage of at least one electrode among said electrodes which is in a focusing electric field region having the largest electron beam focusing effect within said lens so that the said magnetic field has a magnetic flux density of about 20 to 80 percent of that which may be required when said magnetic field generating means is solely used for the electromagnetic focusing of the electron beam in said electric field region, thereby focusing the electron beam again.

5. The method as defined in claim 1 including superimposing the field provided by the electromagnetic focusing means over a substantial portion of the field provided by the electrostatic focusing electrode assembly to thereby focus the electron beam.

* * * * *